Oct. 15, 1968 E. C. ELSNER ET AL 3,405,597
TENSION INDICATOR FOR FASTENING MEANS
Filed April 25, 1966
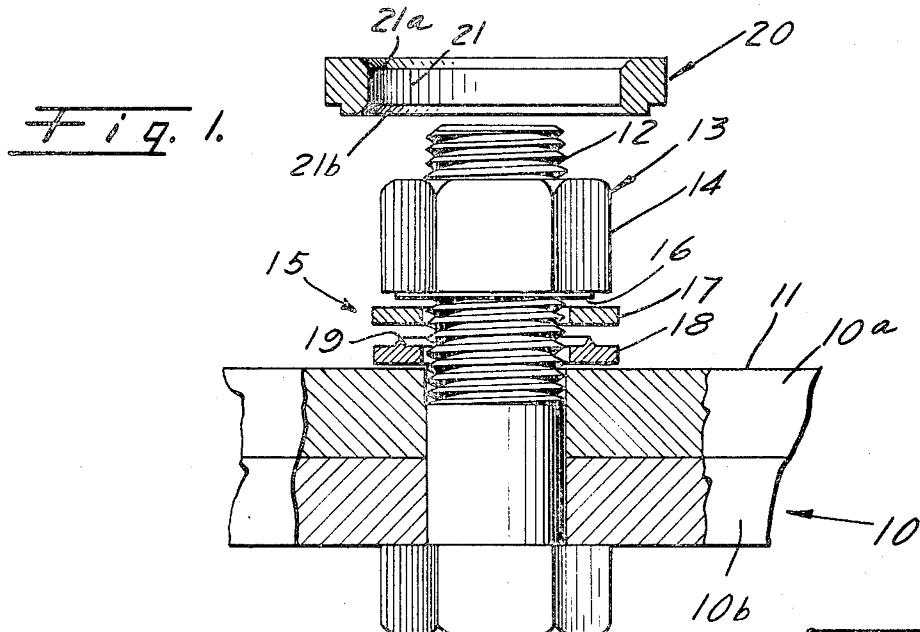
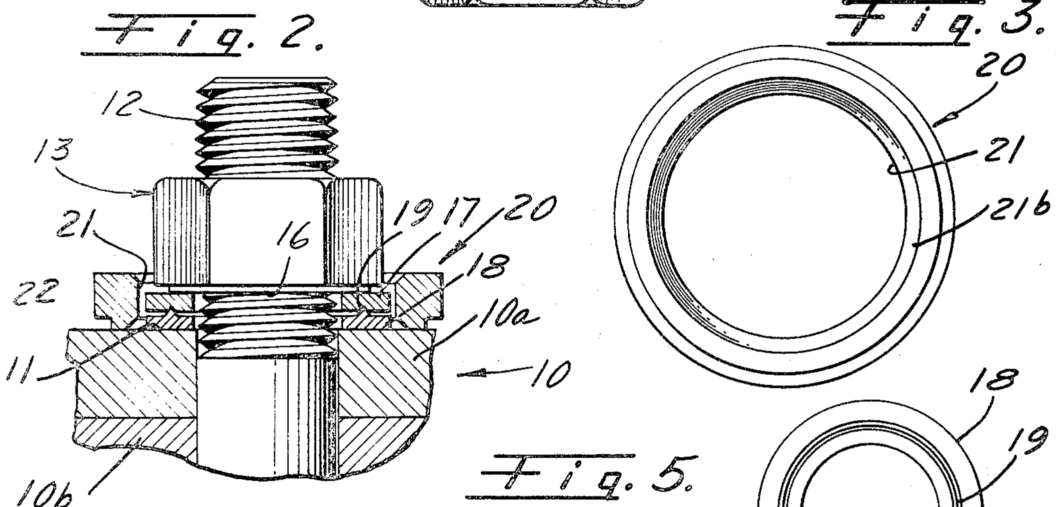
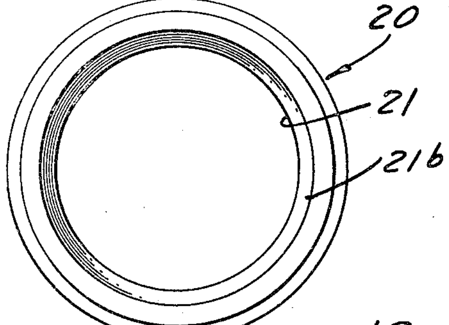
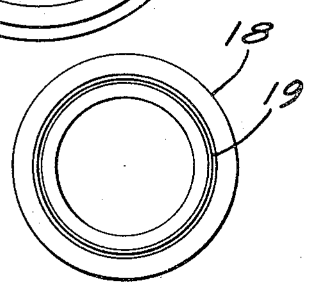
Fig. 4.
17
Edwin C. Elsner,
Floyd G. Hahn,
Hugh W. Littlebury, Sr.,
INVENTORS
WHANN & Mc MANIGAL
Attorneys for Applicants
by

3,405,597
TENSION INDICATOR FOR FASTENING MEANS

Edwin C. Elsner, Tujunga, Floyd G. Hahn, Lakeview Terrace, and Hugh W. Littlebury, Sr., Woodland Hills, Calif., assignors of fifty-one percent to Edwin C. Elsner, twenty-nine percent to Max Fink, ten percent each to Floyd G. Hahn and Hugh W. Littlebury, Sr., all of Los Angeles County, California Filed Apr. 25, 1966, Ser. No. 544,767
2 Claims. (Cl. 85—62)

ABSTRACT OF THE DISCLOSURE

Tension indicator and measuring means for fastening devices of the bolt and nut type, which comprises a pair of cooperable superposed washer members to be placed under the nut of the fastening device, one of the washers being of harder material than the other and provided with a confronting concentric circular wedge projection adapted under nut tightening forces to be forced into the confronting face of the other washer and place its peripheral margin under "hoop tension forces" resulting in radial expansion of the washer. This expansion is sensed and measured by a ring gauge coordinated to indicate the radial expansion of the washer concomitant with the creation of a predetermined required residual tension force in the bolt.

The present invention relates generally to fastening devices, and is more particularly concerned with wrench operable fastening means for a threaded stud, bolt, or the like, and which will function in a manner to automatically control and indicate the residual load tension force set up in the stud or bolt.

In many types of installations and structural assemblies, fastening devices of the bolt and nut type are being increasingly utilized. In order, however, that such fasteners shall properly and efficiently function within allowed design limits without failure, it is of primary importance to be able to control and accurately know the residual loading tension which has been applied to the fastening members. For example, the residual tension which has been set up in a threaded member such as a bolt by means of an associated nut or a similar means.

Heretofore, it has been the conventional practice to endeavor to control the tension to desired values by means of torque measuring devices, such as a torque wrench for measuring the torque or twisting moment exerted in tightening a nut on a stud or bolt.

Torque wrenches are relatively expensive, and while their construction may be such as to provide relatively accurate measurements of the apparent torque, inherent errors and inaccuracies may result in the case of threaded fasteners. Although there is a relationship between torque and tension, it has been recognized that this relationship may vary over a considerable range and may be materially affected by the type of lubricant used on the threads, type of plating, the material from which the bolt and nut are manufactured, types of washers used, class and finish of threads as well as numerous other factors. Because of such variations it is difficult if not impossible to establish a definite relationship between torque and tension, which will be suitable for all conditions, and each application thus constitutes a separate problem in which the various factors must be considered.

Having in mind the inherent complexities and disadvantages attending the use of torque wrenches for determining the residual tension in bolt and nut type fasteners, the present invention in accordance with its broad concepts seeks to provide relatively simple, inexpensive means whereby the residual or load tension forces may be reliably and accurately controlled and sensed without dependence on the torque forces required to tighten the nut means on the stud or bolt.

A further object of the described invention is to provide fastening means including a threaded member and wrench operable nut means in which the required residual tension forces will result from the wrenching operation, and may be sensed independently and irrespective of the actual torque required to motivate the nut means.

A still further object is to provide in combination with fastening means of the nut and bolt type, means which will physically respond to the application of tension forces to the bolt in a predetermined known manner, and which will provide through its physical changes a sensible indication thereof.

Another object of the invention is to provide an improved and unique method for applying and determining the amount of residual tension loading force for threaded fastening means.

Still another object of the invention is to provide novel means of sensing when the residual tension loading forces in threaded fastening means reaches a predetermined value.

Briefly, the above noted objects are obtained according to the present invention by providing a pair of cooperable washers which can be disposed in superposed relation under the nut of the fastening device, one of these washers on its confronting surface being provided with a concentric circular wedge projection which will be forced into the confronting surface of the other washer and cause its radial expansion under the hoop tension forces created in its peripheral margin. This expansion will be proportioned to the residual tension forces in the bolt or stud of the fastening device, and by sensing this expansion by means of a calibrated gauge, an indication and measurement is provided which permits tightening of the fastener until the required tension forces are obtained.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is an enlarged elevational view, partly in section, showing fastening means and sensing means embodying the features of the present invention, the parts of the fastening means being in assembled relation ready for tightening operation;

FIG. 2 is a fragmentary view showing the relationship of the cooperatively associated parts of the fastening means and sensing means, after the tightening or securing operation has been partially completed;

FIG. 3 is a detailed bottom view of the gauge ring member, used in the sensing means of the present invention;

FIG. 4 is a top plan view of the radially expandable washer of the tension responsive means of the invention; and FIG. 5 is a top plan view of the annular wedge used for radially expanding the washer shown in FIG. 4.

Referring now generally to the drawings, the fastening means of the present invention for illustrative purposes has been disclosed as comprising generally a workpiece 10 which may comprise a single structural member or, as shown, may comprise a plurality of plates 10$^a$, 10$^b$ or the like which are to be secured in position by means of a threaded fastening device of the bolt and nut type, and wherein in the conventional arrangement the nut would be tightened against a seating surface 11 of the workpiece.

More specifically, as shown, the fastening device comprises a threaded bolt or stud 12 carried by the workpiece, and having an end portion projecting perpendicularly to the seating surface 11.

In the present invention, a nut 13 is provided, this nut having threaded engagement with the threads of the bolt or stud, and being provided with conventional multisided head portion 14 for receiving a suitable wrench by means of which the nut may be rotated and moved to final position of securement, in which the abutment end face of the nut having at least a standard area according to conventional design is brought into seating engagement with the seating surface 11 of the workpiece. As the nut is tightened, the stud is subjected to tension forces, and when fully tightened provides a residual or load tension force on the bolt or stud. As thus far described, the fastening device constitutes the conventional arrangement, and it will be readily apparent that due to the many variable factors involved, such as materials of construction, lubrication, etc., there is no way to determine whether the fastening device has been installed with the parts in underloaded or overloaded condition.

In order for fastening devices of the herein described type to properly and efficiently function, it is necessary to provide some means whereby the residual loading tension on the bolt may be accurately determined. To meet this requirement, it has been the conventional practice to utilize torque wrenches of one type or another with a view to determining the residual load tension force in the bolt or stud as a result of the relationship existing between the torque forces exerted in tightening the nut and the concomitant resulting tension forces in the stud or bolt. However, such procedure is far from satisfactory due to the wide variation in results obtained which may be varied by numerous factors such as differences in materials of manufacture, lubrication of the parts, differences in thread structures and materials, etc.

In order to overcome these deficiencies, the present invention briefly utilizes annular means, as generally indicated at 15, which are positioned between an abutment end face 16 of the nut and the seating surface 11 of the workpiece, and contains parts coactive under the load tension forces during tightening of the nut to radially expand the annular means in a manner to be hereinafter explained in detail. By sensing this radial expansion it is possible to readily and accurately ascertain when the load tension forces reach a predetermined desired value. More specifically, the annular means, as best shown in FIG. 1, comprises an annular washer member 17 which is positioned in superposed relation to a second annular washer member 18, these washers being assembled as shown in the space between the abutment end face 16 and the seating surface 11. The washer 17 is shown as being of uniform thickness with parallel end faces, and of slightly larger outside diameter than the washer 18. The under end face of the washer 18 is smooth, while the other end face which is in confronting relation to the washer 17, is provided with a concentric projection 19 which forms a circular wedge. The spacing of this wedge may be varied between the inner and outer diameters of the washer 18, but is disclosed as being positioned slightly inwardly of the medial circumference of the washer.

As shown in FIG. 2, as the nut 13 is tightened, the washer members 17 and 18 will be compressed together between the abutment end face 16 and seating surface 11, and as the compressive forces are increased, and the concomitant tension forces in the bolt or stud 12 increased accordingly, the circular wedge formed by the projection 19 will be forced into the confronting surface of the annular washer member 17. As the above forces are increased, the wedge places the outer peripheral margin of the washer 17 under "hoop tension forces" which cause a radial expansion of the washer 17 and consequent increase of its outer diameter, particularly in the peripheral margin of the washer 17 which extends beyond the outer circumferential edge of the surface 16 of the nut. The increase in diameter, as explained above, is utilized as a measure of the tension forces which are being set up in the stud or bolt 12. The increase in washer diameter in its broad concept may be sensed by any tool or device capable of minute measurements.

In the present invention, the diametric change of the washer 17 is sensed by a ring gauge 20 which is disclosed as having a central opening defined by a cylindrical wall 21, this wall at its ends being slightly beveled, as indicated at 21*a* and 21*b*, to facilitate movement of the gauge to and from the operative position shown in FIG. 2 surrounding the annular means 15. It will be observed that the internal diameter of the cylindrical wall 21 is slightly greater than the outer diameter of the washer 17. At the beginning of the nut tightening operation, there will therefore be an annular space or a clearance 22 between the outer peripheral edge of the washer 17 and the wall 21. At this time, the noted clearance may be sensed by the fact that the ring gauge 20 may be easily rotated. As the tension forces are increased by a further tightening of the nut 13, the diameter of the washer 17 will have increased to such an extent that free rotation of the ring will be physically inhibited by reason of frictional engagement of the washer outer surface edge with the wall 21. It will therefore be apparent that by properly proportioning the diameter of the cylindrical wall 21 with respect to the diameter of the washer 17 at the time that the tension forces have reached the predetermined desired upper limit, it becomes a simple matter to determine when the nut 13 has been sufficiently tightened to produce the required and desired load tension forces in the bolt or stud. After the nut 13 is tightened the required amount, the gauge 20 may be removed for use in setting up the nuts of successive studs or bolts.

It will be appreciated that the washer members of the annular means 15 as well as the ring gauge will be properly designed and proportioned for studs and bolts of particular size and materials so as to provide the proper tension load forces in each case.

By way of a practical example, which is illustrative of the means and method of the present invention, the invention was applied to a one-half (½) inch bolt of a material having an ultimate tension force of 16,000 p.s.i., and in which the parts were so arranged as to obtain a tension force of 60% or more (up to approximately 15,000 p.s.i.). In such case, the washer member 17 was constructed of mild steel SAE No. 1010 with an outside diameter of .875", approximate inside diameter of .531", and thickness of .065".

Associated with the foregoing washer was the washer member 18 which was constructed of 4130 steel having a hardness of 38 to 42 Rockwell and tensil strength of 176,000 to 200,000 p.s.i. In this case the outer diameter was .850", inside diameter approximately .531", and thickness .065". The projection forming the circular wedge was of a height of approximately .016", and with symmetrically inclined inner and outer surfaces with a 60° included angle. The wedge edge was outwardly spaced .070" distance from the outer periphery of the internal diameter of the washer.

In this example, the internal diameter of the cylindrical wall 21 of the ring gauge was approximately .010" greater than the normal outside diameter of the washer member 17 prior to its being expanded.

From the foregoing description it is believed apparent that the present invention provides an improved arrangement and method by which predetermined tension forces may be accurately and simply determined for fastening devices of the bolt and nut type without the use of a torque wrench, and regardless of torque losses due to friction in the threads, friction between bearing surfaces of the nut and workpiece, and other variable factors which prevent accuracy of control with present conventional means.

Various modifications may suggest themselves to those skilled in the art without departing from the spirit of our invention, and, hence, we do not wish to be restricted to the specific form shown or uses mentioned, except to the extent indicated in the appended claims.

We claim:

1. The combination with a threaded member and associated nut having an abutment end face adapted to engage a seating surface, of means for controlling and measuring the load tension force applied to the threaded member during tightening and setting up of the nut, comprising:

(a) annular means adapted to be positioned between and axially aligned with the abutment end face of the nut and the seating surface, said means including a first annular washer of relatively soft material and a second annular washer of a material harder than that of said first washer, said washers being positioned in juxtaposed relation, said second washer having an annular projection being wedge-shaped in cross section and extending in the direction of said first washer, said first washer and said projection being coactive under nut tightening forces to apply a radial force component circumferentially to radially expand said first washer as a function of the load tension forces; and (b) feeler gauge means having an internal transverse dimension greater than the normal unexpanded external diameter of said first annular washer for measuring the changed diameter of said washer.

2. The combination according to claim 1, wherein the feeler gauge means comprises a ring member extending around said washers and being normally freely rotatable, but frictionally engaged with said first washer when a predetermined radial expansion thereof occurs.

References Cited

UNITED STATES PATENTS

| | | | |
|---|---|---|---|
| 2,756,795 | 7/1956 | Clingman | 151—35 |
| 3,153,974 | 10/1964 | Canning | 85—62 |
| 3,160,054 | 12/1964 | Cohen et al. | |
| 3,179,082 | 4/1965 | McClean | 85—62 |

CARL W. TOMLIN, *Primary Examiner.*

R. S. BRITTS, *Assistant Examiner.*